Nov. 1, 1932.  E. C. GRAHAM  1,886,092
CITROUS FRUIT JUICE EXTRACTOR
Filed Feb. 23, 1932  3 Sheets-Sheet 1
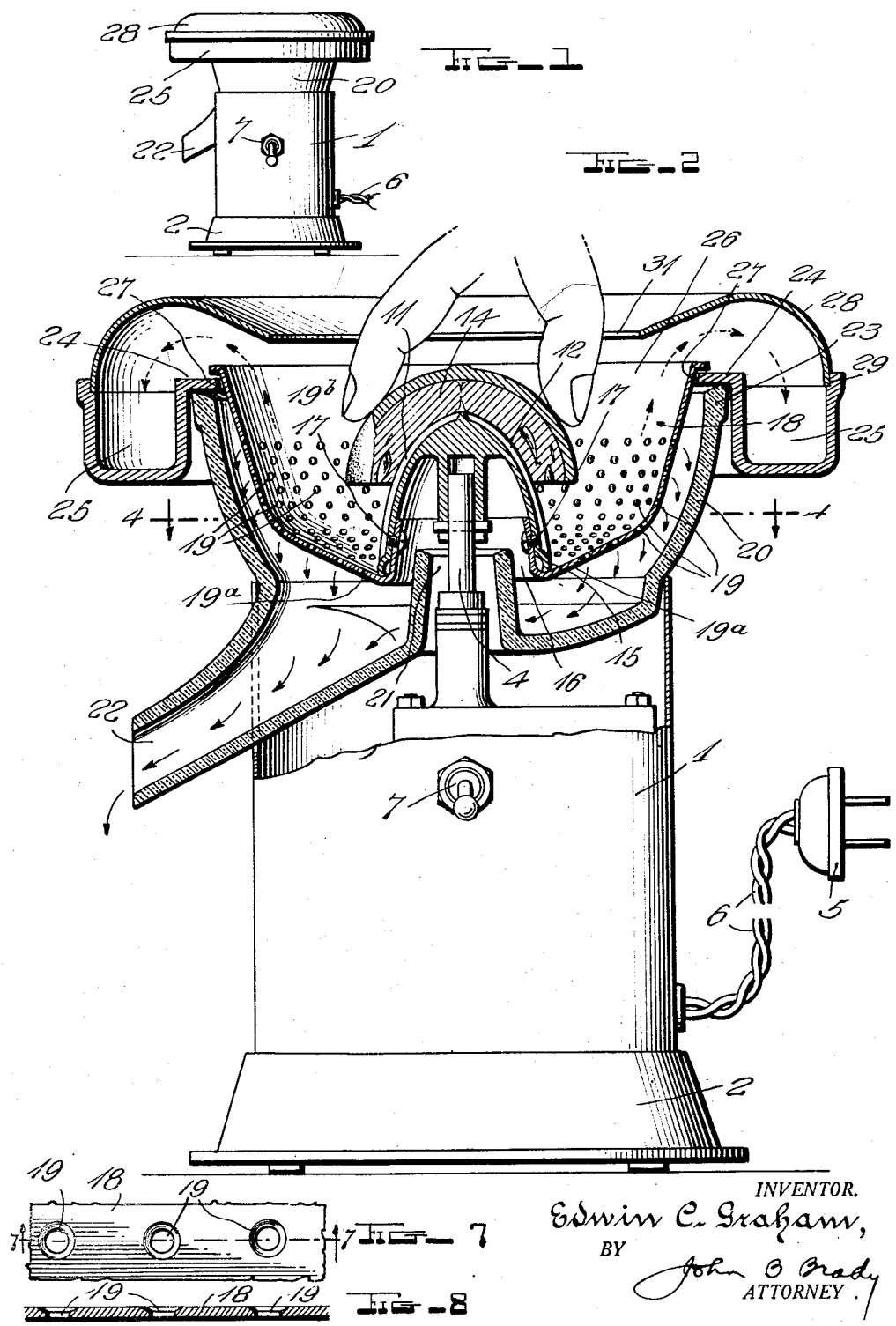

Nov. 1, 1932.  E. C. GRAHAM  1,886,092
CITROUS FRUIT JUICE EXTRACTOR
Filed Feb. 23, 1932   3 Sheets-Sheet 2
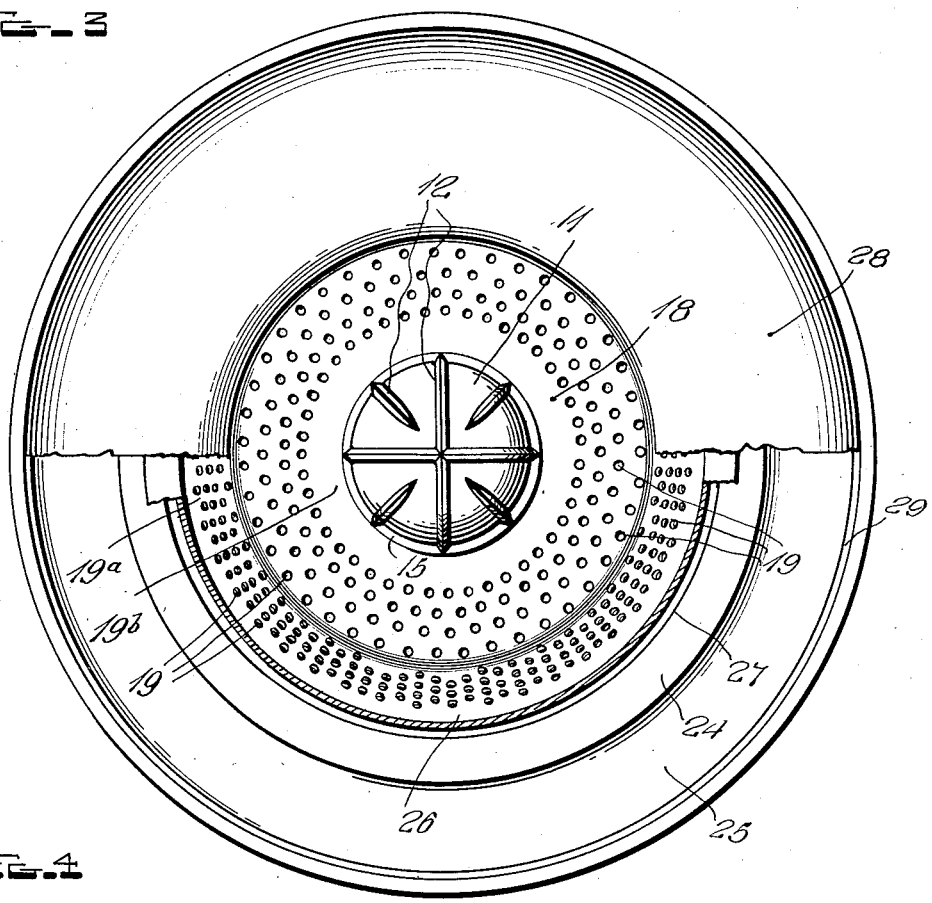
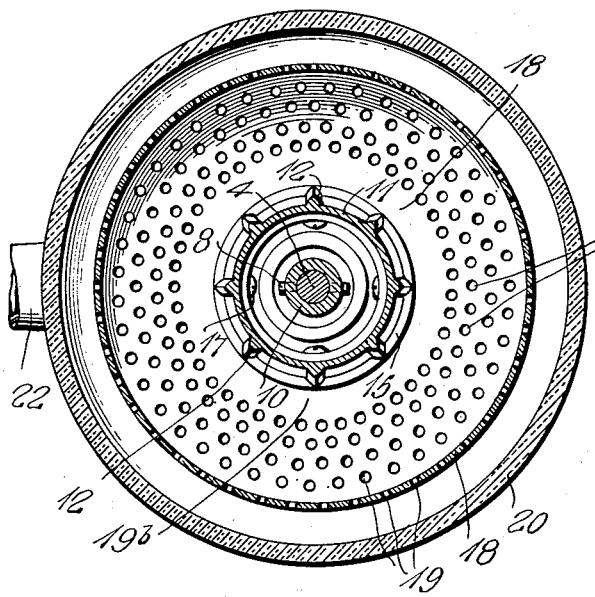
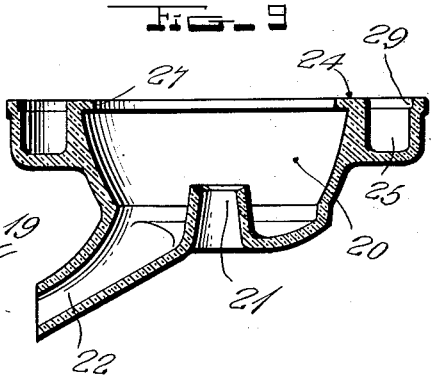
INVENTOR.
Edwin C. Graham,
BY John C. Brady
ATTORNEY.

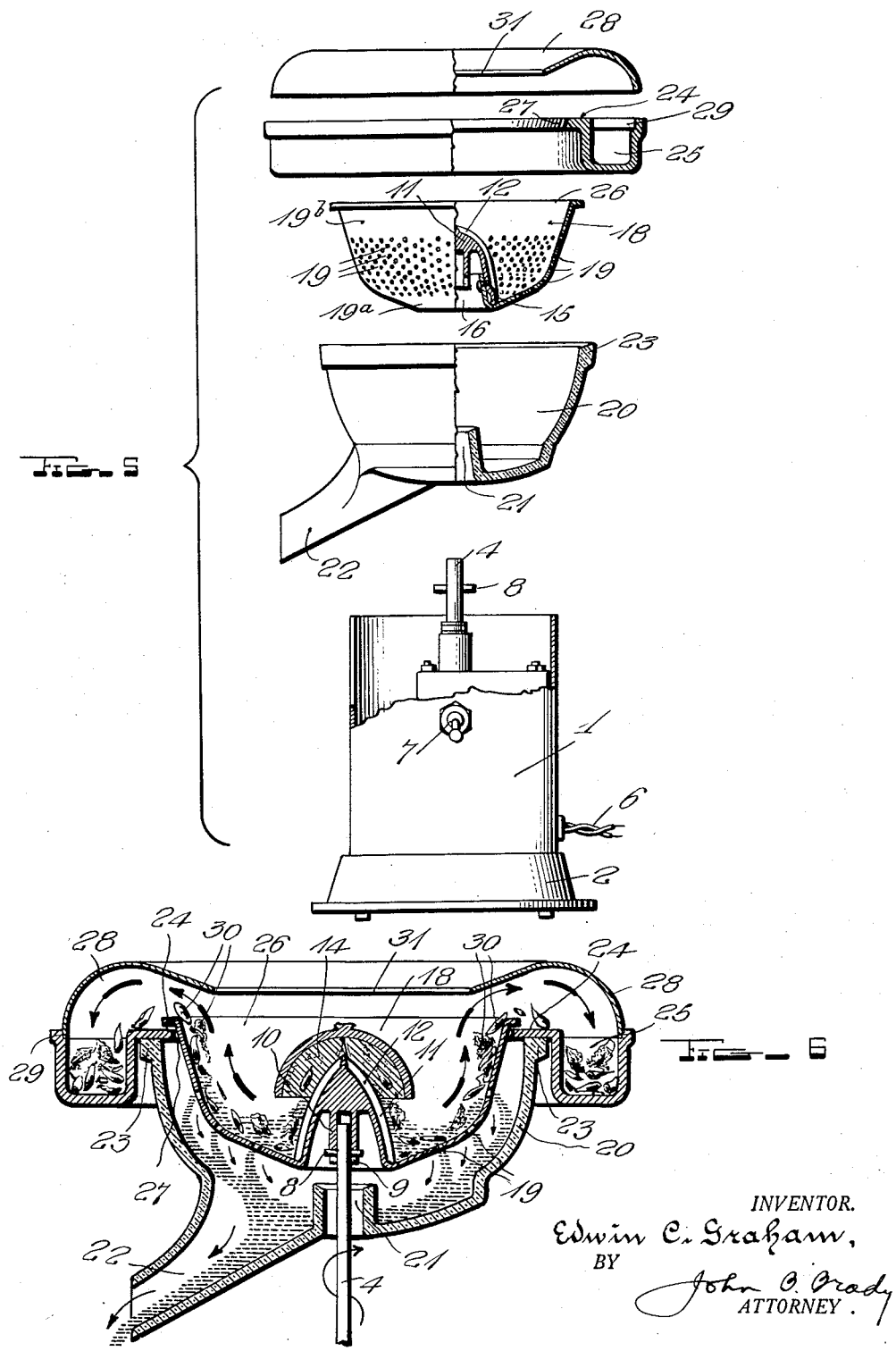

Patented Nov. 1, 1932

1,886,092

UNITED STATES PATENT OFFICE

EDWIN C. GRAHAM, OF WASHINGTON, DISTRICT OF COLUMBIA, ASSIGNOR TO NATIONAL ELECTRICAL SUPPLY COMPANY, OF WASHINGTON, DISTRICT OF COLUMBIA, A CORPORATION OF VIRGINIA

CITROUS FRUIT JUICE EXTRACTOR

Application filed February 23, 1932. Serial No. 594,697.

My invention relates broadly to mechanism for extracting juice from citrous fruits and more particularly to a mechanism for simultaneously separating seeds and other particles from the fruit juice and aerating the juice thus freed of foreign matter for increasing the palatableness of the drink.

One of the objects of my invention is to provide a construction of juice extractor for citrous fruits in which seeds and pulp are centrifugally separated from the juice during the extracting process and the juice strained and supplied for beverage or other purposes.

Another object of my invention is to provide a construction of juice extractor for citrous fruits in which the seeds and particles of pulp are separated from the juice obtained from the citrous fruit and the juice given an aerating operation for producing a light frothy fluid for beverage or other purposes.

Still another object of my invention is to provide an improved method for extracting the juice from citrous fruit and removing the seeds and particles of pulp therefrom while imparting an aerating operation to the juice thus extracted for producing a beverage having a light and frothy characteristic.

A further object of my invention is to provide a juice extracting machine for citrous fruit having a minimum number of parts and designed for cooperative arrangement in a manner facilitating assembly and disassembly for cleaning operations.

A still further object of my invention is to provide a construction of juice extractor for citrous fruits having means for extracting the juice from the fruit and effecting a centrifugal separation of the seeds and pulp-like particles from the fruit and removing such seed and pulp-like particles to a receiving trough at the outside limits of the juice extracting machine.

Another object of my invention is to provide a construction of annular trough-like receptacle adapted to be mounted upon the periphery of the juice extracting bowl of a fruit juice extractor and having means associated with the trough-like receptacle for directing seeds, pulp-like particles reamed from a citrous fruit into the trough-like receptacle for effecting a separation of the seeds and pulp simultaneously with the juice extracting operation.

Other and further objects of my invention reside in the method of extracting juice from citrous fruits and the construction of an apparatus for carrying out such method as set forth more fully in the specification hereinafter following by reference to the accompanying drawings, in which:

Figure 1 is a side elevation of the fruit juice extractor of my invention; Fig. 2 is a vertical sectional view taken through the fruit juice extractor of my invention and showing the driving mechanism of the fruit juice extractor in side elevation; Fig. 3 is a top plan view of the fruit juice extractor of my invention with part of the top portion of the extractor broken away to illustrate the moving parts of the extractor; Fig. 4 is a lateral cross-sectional view taken through the fruit juice extractor on line 4—4 of Fig. 2; Fig. 5 illustrates the fruit juice extractor and the several parts thereof preparatory to assembly; Fig. 6 is a theoretical view illustrating my improved method of extracting the juice from the citrous fruit and the manner in which the juice is aerated and rendered frothy; Figs. 7 and 8 are detailed views showing the construction of the strainer employed in the fruit juice extractor of my invention, the views being taken upon an enlarged scale for more fully disclosing the construction of my invention; and Fig. 9 illustrates a modified construction of juice collecting bowl and trough-like receptacle which is integrally connected therewith for receiving the seeds and pulp-like particles separated from the juice during the extracting process.

My invention is directed to a method of extracting juice from citrous fruits and centrifugally separating seeds and pulp-like particles from the juice while imparting an aerating operation to the juice thus extracted for producing a beverage having light and frothy characteristics. I employ an electrically operated driving motor geared to a vertically disposed shaft. The shaft extends through an upwardly protruding central portion of a juice collecting bowl and receives on the upper extremity thereof a reamer head. The reamer head has a bowl-like strainer connected to the lower edge portion thereof. The bowl-like strainer is rotatably driven by the rotary shaft through the connection thereof with the reamer head. The bowl-like strainer extends above the periphery of the juice collecting bowl and is adapted to direct seeds and pulp-like particles into an annular trough which surrounds the juice collecting bowl. A cover member is provided for directing the seeds and pulp-like material into the annular trough. The operator may readily press the citrous fruit against the reamer head in performing the extracting operation. The juice is whirled by the bowl-like strainer at a high rate of speed and intermingled with particles of air, producing an aerated liquid which is delivered to a suitable container as a beverage having light and frothy characteristics. The drink produced with the machine of my invention has highly palatable qualities. The parts of the apparatus are extremely simple and may be produced inexpensively on a quantity production basis. The parts may be readily assembled or disassembled thereby insuring a highly sanitary form of apparatus.

Referring to the drawings in more detail, reference character 1 designates a casing, mounted upon a suitable support 2 and containing a driving motor geared to a vertically extending rotatable shaft 4 driven by the motor. The motor (not shown) is electrically connected to any suitable power supply circuit through the connector plug 5 and flexible lead 6 through switch 7 to the terminals of the motor 3. Operation of switch 7 permits the motor to be cut on or off for starting and stopping the driving motor. The shaft 4 has a member 8 thereon which serves to engage diametrically extending slots 9 formed in the depending portion 10 of the reamer head 11. The reamer head 11 is provided with ribs 12 which serve to squeeze or extract the juice from the citrous fruit 14, as the citrous fruit is pressed downwardly against the rotating reamer head as represented in Figs. 2 and 6. The lower edge of the skirt of the reamer head 11 terminates in an annular bead 15.

Interiorly of the reamer head 11 there is secured the upstanding outer projecting portion 16 of the bowl-like strainer 18 which is secured by screws 17 to the reamer head 11. The bowl-like strainer 18 is provided with a plurality of perforations 19 through which the juice is centrifugally distributed to the juice collecting bowl 20. The juice collecting bowl 20 has an annular upstanding central portion 21 through which rotatable shaft 4 projects. The upstanding portion 21 serves to guide the juice around the shaft 4 and prevents leakage through the shaft entrance and enables the juice to be collected in bowl 20 for delivery through the spout 22 to any suitable receptacle in which the beverage or juice is collected. The juice collecting bowl 20 has an upper annular periphery 23 thereon which serves as a support for the inner edge 24 of the annular trough-like receptacle 25. The trough-like receptacle 25 extends wholly around the bowl-like strainer 18. The upper edge 26 of the bowl-like strainer 18 extends above the plane of the annular inner edge 24 of the trough-like receptacle 25. The face 27 of the edge portion 24 is disposed at an angle conforming with the inclination of the strainer-like bowl 16 so that an extremely short gap or space is provided between the side of the bowl-like strainer and the annular edge 24 to prevent seepage of matter between the bowl-like strainer and the trough. An annular cover member 28 fits in a peripheral groove 29 on the edge of the trough-like receptacle 25 and forms a cover extending over the edge of the bowl-like strainer 18 and over the annular trough-like receptacle 25 for guiding the seeds and pulp-like particles 30 illustrated more clearly in the theoretical view in Fig. 6 over to a final discharge position in the trough-like receptacle 25. The central portion of the cover 28 is provided with an aperture 31 through which the operator passes the citrous fruit. The citrous fruit may be pressed against the reamer head by the hand of the operator passing through the aperture 31. The cover 28 not only serves to guide and direct the seed and pulp-like particles from the bowl-shaped strainer 18 into the annular trough-like receptacle 25 but cover member 28 also serves as a convenient hand rest for the operator while performing an extracting operation. The bowl-like strainer 18 is foraminated as at 19 by means of perforations uniformly distributed throughout the area thereof between an annular solid zone 19a and up to a solid zone 19b adjacent the upper edge 26 of the bowl-like strainer 18. Figs. 7 and 8 show more clearly the construction of the apertures 19 in the bowl-like strainer 18 on an enlarged scale. These apertures are each beveled on the inner surface of the bowl to allow the juice to freely pass through the bowl. The bowl-like strainer 18 is rotated at a high rate of speed thereby subjecting the seeds 30 and particles of pulp which have a certain amount of mass to centrifugal action causing such seed and pulp-like particles to climb up the sides of the bowl 18 and to be discharged in a substantially dry condition in the annular trough-like receptacle 25 as heretofore described. The juice is subjected to a whirling action and is ejected through the apertures 19 and simultaneously commingled with particles of air. The juice and air particles strike the side walls of the juice extracting bowl 20 and gravitate through discharge spout 22 into a suitable beverage collecting receptacle. The whirling action produced upon the juice so commingles the juice with the air that a beverage having light fluffy characteristics is produced. A noticeable increase in the palatable quality of the drink may be readily observed when using the fruit juice extracting apparatus of my invention.

As illustrated in Fig. 9, the juice collecting bowl is moulded integral with the discharge spout and pulp collecting trough which extends around the upper periphery of the juice collecting bowl. The moulding of the juice collecting bowl, upwardly extending hub, discharge spout and annular trough in one unit greatly simplifies the construction of the apparatus and reduces the cost thereof. I may mould the bowl, trough and spout from glass or phenol condensation products or compositions thus rendering the manufacturing cost extremely low. The bowl shaped strainer 18 may be formed integral with the reamer head 11 for decreasing the cost of manufacture. Modifications may be made in the structure of the annular cover 28 and other changes in the construction and arrangement of parts may be made.

The structure of my invention has proven highly practical and efficient in its operation, and while I have described certain preferred embodiments of my invention, I desire that it be understood that modifications may be made and that no limitations upon my invention are intended other than are imposed by the scope of the appended claims.

What I claim as new and desire to secure by Letters Patent of the United States is as follows:

1. A fruit juice extractor comprising a rotatable shaft, a reamer removably carried by said shaft, a bowl shaped strainer disposed about said reamer, a juice collecting bowl disposed about said strainer, and a removable annular trough surrounding said bowl and having a portion resting upon the upper edge of the bowl to removably support the trough, said strainer having a portion overlying the supporting portion of the trough for engagement thereby when the trough is lifted upwardly to cause the strainer and reamer to be drawn upwardly and detached from the shaft when the trough is lifted out of place.

2. A fruit juice extractor comprising a rotary shaft, a reamer removably carried by said shaft, a bowl shaped strainer secured about said reamer, a stationary juice collecting bowl disposed beneath and about the strainer, and a removable trough surrounding said bowl and supported thereby, said strainer having a peripheral portion overlying the inner edge of the trough, said strainer being shaped to cause seeds and pulp to be centrifugally discharged from the strainer over the marginal edge thereof into the trough, the trough when lifted out of place engaging the overlying peripheral portions of the strainer to withdraw the strainer and reamer.

3. A fruit juice extractor comprising a rotatable shaft, a reamer removably carried by said shaft, a bowl shaped strainer disposed about said reamer, a juice collecting bowl disposed about said strainer, an annular trough integrally connected with the periphery of said bowl, said strainer having a portion overlying the upper portion of said trough for engagement thereby when the bowl and trough is lifted upwardly to cause the strainer and reamer to be drawn upwardly and detached from the shaft when the bowl and trough is lifted out of place.

4. A fruit juice extractor comprising a rotary shaft, a reamer removably carried by said shaft, a bowl shaped strainer secured about the bottom of said reamer and having an upwardly extending annular wall surrounding the reamer and formed with an outstanding flange about its upper edge, a bowl disposed beneath and about said strainer and having its upper edge terminating in a plane beneath the flange of said strainer, an annular trough surrounding said bowl and having a supporting flange resting upon the upper edge of the bowl and extending beneath the flange of the strainer, and means to guide seed and pulp discharged by centrifugal force from the strainer into the trough.

5. A fruit juice extractor comprising a rotary shaft, a reamer removably carried by said shaft, a bowl shaped strainer secured about the reamer and having an upwardly extending annular wall, a juice collecting bowl disposed beneath and about said strainer, an annular trough surrounding the upper portion of said bowl and supported thereby, and an annular cover removably supported by the outer wall of said trough and extending inwardly over the trough beyond the upper edge of said strainer to direct pulp and seed discharged by centrifugal force from the strainer into the trough and serve as a hand rest when applying fruit to the reamer.

6. A fruit juice extractor comprising a rotary shaft, a reamer removably carried by said shaft, a bowl shaped strainer secured about the bottom of said reamer and having an annular wall formed with an outstanding flange about its upper edge, a juice collecting bowl disposed beneath and about said strainer and having its upper edge in a plane beneath the flange of the strainer, and a trough surrounding the upper portion of said bowl and having a supporting flange resting upon the edge of the bowl and extending beneath the flange of the strainer whereby seed and pulp may pass from the strainer into the trough and the flange of the trough engage the flange of the strainer when the trough is lifted out of place and cause the strainer and reamer to be drawn upwardly out of place when the trough is removed.

7. A fruit juice extractor comprising a rotary shaft, a reamer slidable into and out of position about the upper portion of said shaft and formed with opposed side slots, a pin extending through said shaft and projecting from opposite sides thereof to engage in the slots and cause the reamer to turn with the shaft, a bowl shaped strainer secured about the lower end of said reamer and having an upwardly extending annular wall terminating in an outstanding flange, a juice collecting bowl surrounding the shaft and strainer and having its upper edge in a plane beneath the flange of the strainer, a trough surrounding the upper portion of said bowl and having a supporting flange resting upon the edge of the bowl and extending beneath the flange of said strainer to allow seed and pulp centrifugally discharged from the strainer to pass freely into the trough, the flange of the trough being adapted to engage the flange of the strainer when the trough is lifted and cause the strainer and reamer to be elevated with the trough and detached from said shaft, and an annular cover removably supported upon the outer wall of the trough and extending inwardly over the upper edge of the strainer in spaced relation thereto and having a central aperture through which fruit may be pressed against the reamer, said cover serving as a hand rest and operating to guide seed and pulp discharged from the strainer into the trough.

In testimony whereof, I affix my signature.

EDWIN C. GRAHAM.